United States Patent [19]

Jacubert et al.

[11] Patent Number: 4,601,798
[45] Date of Patent: Jul. 22, 1986

[54] CONTINUOUS PREPARATION OF SILANE, $SIH_4$

[75] Inventors: Serge Jacubert, Viroflay; Jean Grosbois, L'Isle Adam; Jean-Michel Verdier, Paris, all of France

[73] Assignee: Rhone-Poulenc Specialites Chimiques, Courbevoie, France

[21] Appl. No.: 527,869

[22] Filed: Aug. 30, 1983

[30] Foreign Application Priority Data

Aug. 31, 1982 [FR] France ............................... 82 14863

[51] Int. Cl.$^4$ .......................... C25B 1/02; C25B 15/08
[52] U.S. Cl. ..................................... 204/61; 204/245; 204/247
[58] Field of Search ................... 204/61, 68, 245, 247; 423/347

[56] References Cited

U.S. PATENT DOCUMENTS 3,078,218  2/1963  Sundermeyer ........................ 204/61
3,192,138  6/1965  Euk et al. ............................. 204/61
4,041,136  8/1977  Franklin et al. ..................... 423/347

Primary Examiner—Howard S. Williams
Attorney, Agent, or Firm—Burns, Doane, Swecker and Mathis

[57] ABSTRACT

Silane, $SiH_4$, is continuously produced in an integrated process, by continuously (i) reacting a chlorosilane with the lithium hydride recycled in a base mixture of molten salts comprising lithium chloride and at least one other alkali or alkaline earth metal chloride, in a discrete first reaction zone, (ii) recovering silane product from said first reaction zone, (iii) cycling the silane depleted product of reaction from said first reaction zone, which comprises said base mixture and the additional amounts of LiCl produced in said first reaction zone, to a discrete electrolysis second reaction zone, (iv) electrolyzing lithium chloride comprising said first zone reaction product in said electrolysis second reaction zone, (v) recovering chlorine gas from said electrolysis second reaction zone, (vi) cycling the chlorine depleted product of electrolysis from said second reaction zone, which comprises said base mixture and the lithium metal produced in said electrolysis second reaction zone, to a discrete hydrogenation third reaction zone, (vii) hydrogenating the lithium metal comprising said second zone reaction product in said hydrogenation third reaction zone, and (viii) recycling the product of reaction from said hydrogenation third reaction zone, which comprises said base mixture and the first zone reactant lithium hydride produced in said hydrogenation third reaction zone, to said first reaction zone.

17 Claims, 3 Drawing Figures

CONTINUOUS PREPARATION OF SILANE, SIH$_4$

BACKGROUND OF THE INVENTION

1. Field of the Invention

The present invention relates to apparatus and process for the preparation of silane, and, more especially, for the continuous preparation of silane.

2. Description of the Prior Art

It is known to this art to prepare silane (SiH$_4$) by reacting chlorosilanes having the formula SiH$_{4-x}$Cl$_x$, wherein x is advantageously 3 or 4, with lithium hydride (LiH), and such reaction has been described, for example, in U.S. Pat. No. 3,078,218 and French Pat. No. 2,365,518. The subject chemical reaction employed may thus be represented as:

$$SiH_{4-x}Cl_x + x\ LiH \rightarrow SiH_4 + x\ LiCl$$

The lithium hydride starting material is provided by reacting metallic lithium with hydrogen, with the lithium metal itself produced by the electrolysis of lithium chloride. According to the process described in the aforenoted patents, it is known to carry out each of the electrolysis, hydrogenation and silane production reactions in the same medium consisting of molten salts selected from among alkali and alkaline earth metal chlorides, one of which being lithium chloride.

According to such process, the different reactions are conducted in a single, high capacity apparatus, wherein the reaction medium itself plays the dual role of both supplying the reactant (lithium chloride) and also acts as a thermal flywheel, or heat exchanger, to eliminate the heat generated by the different chemical reactions. However, and this is one of the principal disadvantages of the process immediately above-described, the reaction medium which contains the lithium chloride must be used in very large amounts with respect to the amount of lithium chloride (reactant) which is converted in the different reactions. Furthermore, the use of a single apparatus in which the reaction medium also acts as a thermal flywheel does not permit carrying out each of the respective reactions under optimum conditions.

Also known to the prior art, as described in Japanese Kokai No. 56.169120 (Application No. 55.72789), is a process similar to that in the U.S. Pat. No. 3,078,218, and according to which the different reactions are again carried out in a single apparatus, but in which the lithium produced by electrolysis, instead of being immediately hydrogenated upon formation thereof, is separated from the medium of molten salts and transferred into the hydrogenation zone. The process described in this patent has the same disadvantages as that described in said U.S. Pat. No. 3,078,218. Furthermore, the means for transferring product from the reaction medium of one reaction zone to another are very complex and difficult to utilize on an industrial scale. In addition, such single devices render the separation of the chlorine and the hydrogen quite difficult, a separation that is absolutely necessary for the safe use of industrial facilities.

Also known to this art, from U.S. Pat. No. 3,163,590, is a process for the preparation of silane by the same reactions as those described in said '218 patent, wherein the various reactions are effected in a single apparatus, but in separate zones thereof.

Consistent with the embodiments described in said '590 patent, and as illustrated in FIGS. 2 and 4 thereof, it is necessary to separate the lithium metal produced by the electrolysis from the mixture of molten salts prior to its hydrogenation. Furthermore, all of the reactions employed in the process of this patent must be carried out simultaneously, without consideration of their respective kinetics, which are very different, the result being a highly delicate operation of the totality of such reactions, especially in the transition stages of startup, shutdown and variations in production.

SUMMARY OF THE INVENTION

Accordingly, a major object of the present invention is the provision of an improved, integrated process for the continuous preparation of silane and entailing all of reacting chlorosilanes with lithium hydride, the electrolysis of the lithium chloride thus formed and the subsequent hydrogenation of the lithium metal produced, said various reactions being carried out in molten salt media in separate reactors; it is not necessary consistent herewith to separate the metallic lithium produced by the electrolysis from the mixture of molten salts prior to the hydrogenation thereof.

Briefly, the present invention, which flies in the face of the known art for the preparation of silane in molten salts, whether when carried out in a single, high capacity apparatus or in separate zones thereof, provides the following hitherto unattainable advantages:

(1) It permits a very simple and continuous operation, over the course of which a mixture of molten salts, hereinafter designated as the base mixture, serves as the vehicle for the different reactants used in the various different reactions: lithium hydride, lithium chloride, lithium. This provides the essential advantage of permitting a continuous operation in which the mixture of molten salts is used in a continuous and closed circulation (continuous closed loop). The circulation of the molten salts comprising the various different reactants is completely controllable, enables total control over each of said reactions and individual optimization of the operating conditions of each; the invention thus enables complete control over each individual reaction at all times, without any difficulties being experienced during any transition stage, such as startup, shutdown or variations in production;

(2) It makes it possible to minimize the amount of the mixture of molten salts employed, whereby the size of the apparatus used is reduced; and (3) It permits the optimization of the proper conditions necessary for the conduct of each different reaction.

DETAILED DESCRIPTION OF THE INVENTION

Figure 1:
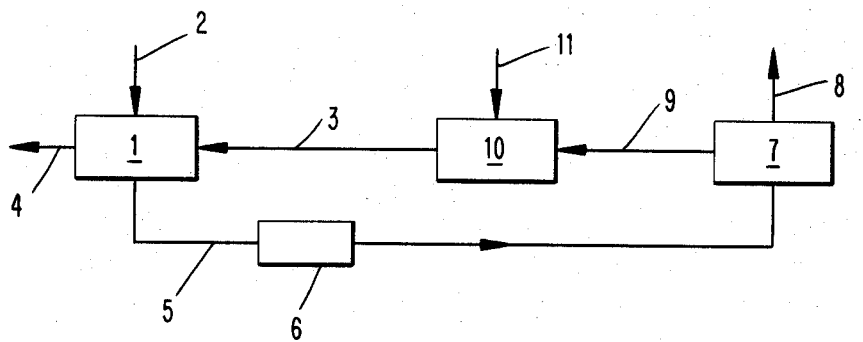
FIG. 1 is a schematic illustration of one embodiment of the apparatus/process according to the invention.

More particularly according to the present invention, it will be appreciated that provided hereby is an improved process which obviates with simplicity and flexibility the bulk of the problems associated with the preparation of silane according to the processes heretofore described in the prior art. Furthermore, it renders feasible the application of an old process on an industrial scale, which in spite of numerous studies and efforts has never been attained.

The present invention, therefore, features a continuous process for the preparation of silane by the reaction of chlorosilanes with lithium hydride, the electrolysis of the lithium chloride thus produced and the hydrogenation of the metallic lithium obtained by electrolysis, these different operations being carried out in specific individual reactors and in a mixture of molten salts comprising lithium chloride and at least one other alkali and/or alkaline earth metal chloride, the composition of said mixture being approximately that of the known eutectic composition, and is characterized in that:

(i) The different individual reactions are carried out in a base mixture comprising a mixture of molten salts containing lithium chloride, potassium chloride and optionally other alkali and/or alkaline earth metal chlorides; the said base mixture is also used for transferring the different reactants employed for the different reactions, lithium hydride, lithium chloride and lithium, and circulating same in a closed loop between and among said reactions;

(ii) The reaction between the chlorosilanes and lithium hydride is carried out in a reaction zone continuously charged, on the one hand with chlorosilanes, and on the other, with a mixture containing the said base mixture and lithium hydride, the amount of lithium hydride being equal to a maximum of 21 moles per 100 moles of base mixture; this reaction produces silane and lithium chloride which derives from the conversion of the lithium hydride;

(iii) The electrolysis of the lithium chloride is carried out in a medium naturally agitated in an electrolyzer which is supplied with the mixture of molten salts emanating from the reaction between the chlorosilanes and the lithium hydride; this mixture of molten salts consists of the base mixture and the lithium chloride product of said reaction, the amount of said lithium chloride being at most equal to 21 moles per 100 moles of the base mixture; the electrolytic reaction produces on the one hand chlorine gas and, on the other, metallic lithium, which is withdrawn together with the base mixture;

(iv) The hydrogenation of the lithium metal is preferably carried out in a hydrogenation reaction zone, under agitation, said hydrogenation reaction zone being supplied, on the one hand, with lithium and the base mixture via the electrolytic cell, and, on the other, with hydrogen; the hydrogenation reaction thus provides the lithium hydride by the conversion of the metallic lithium, and which is withdrawn together with the base mixture and cycled to the reaction zone for the reaction between the chlorosilanes and lithium hydride for the production of the silane.

Insofar as the base mixture serving as the vehicle for the several reactants, LiCl, LiH, Li, is concerned, the reaction medium must remain fluid and transferrable from one reaction zone to the other, and, as the generation of silane gives rise to the concomitant formation of LiCl, it is thus necessary that the base mixture be depleted of LiCl such that the temperature of formation of the silane be as low as possible in order to optimize the production of said silane. Therefore, according to one preferred embodiment of the invention, the composition of the base mixture is selected such that it will be depleted by 1 to 4 mole % of lithium chloride with respect to the eutectic composition of the salts comprising said base mixture.

However, it too is possible to employ base mixtures, which are not depleted in LiCl, but this would necessitate carrying out the reaction at a higher temperature, to maintain the mixture fluid and transferrable, thereby reducing the yield of silane production as a result of the partial cracking thereof.

The alkali and/or alkaline earth metal chlorides employed according to the invention are advantageously the chlorides of sodium, rubidium, strontium, magnesium, calcium and barium. While according to the process of the invention it is preferred to use a mixture of molten salts based on lithium chloride and potassium chloride, it is also within the ambit of the present invention to replace such mixture by another mixture of molten salts having similar properties.

It is further desirable during the transfer or cycling of the base mixture enriched in lithium chloride from the reactor in which the reaction between the chlorosilanes and lithium hydride is carried out to the electrolytic cell, to eliminate any impurities that may be present. Principal impurities are solid particles of silicon, said particles being advantageously eliminated by simple filtration or by treatment with chlorine or hydrogen chloride.

The reaction between the chlorosilanes and the lithium hydride preferably is carried out at a temperature of $380\pm30°$ C.; if this temperature is too low, there is a risk of precipitation of the components of the eutectic composition (i.e., for example, if components forming a ternary eutectic composition are used, the lowest operating temperature would be 350° C.). If, to the contrary, this temperature is too high (higher than approximately 410° C.), the competing reaction of silane cracking develops, resulting in a loss in silicon and the need for purifying the molten mixture emanating from the reactor.

Furthermore, it may be advantageous to eliminate from the base mixture, prior to its transfer to the electrolyzer, the trace amounts of lithium hydride possibly contained therein; this elimination is effected, for example, by reaction with HCl or $Cl_2$, or by any other means.

The chlorosilanes used in the reaction with lithium chloride advantageously are provided by reaction between metallic silicon in powder form and hydrogen chloride or chlorine, the same being produced either directly or indirectly by electrolysis.

The lithium hydride used for the reaction with the chlorosilanes is transferred in intimate admixture with the base mixture and is produced in the stage of lithium hydrogenation. The amount of lithium hydride introduced by means of the base mixture is preferably equal to a maximum of 18 moles per 100 moles of the base mixture.

The electrolytic reaction is carried out at a temperature of $450\pm50°$ C.; it should be noted that this electrolysis reaction typically evolves a certain amount of heat that may be used to heat the molten mixture from $380\pm30°$ C. to $450\pm50°$ C. A higher temperature is favorable, as it is known that the conductivity of the mixture of molten salts increases with temperature. On the other hand, present technical conditions (specially the corrosion resistance of available materials) do not permit carrying out the electrolysis at a temperature higher than 500° C., and further, in spite of the natural protection of the product lithium against reaction of said lithim with the chlorine produced, it is found that at temperatures in excess of 500° C., the recombination reaction of the lithium with chlorine becomes more appreciable.

The amount of lithium chloride in the base mixture deriving from the conversion of the lithium hydride is preferably equal to at most 18 moles per 100 moles of the base mixture.

The chlorine produced over the course of the electrolysis may, possibly after combustion with hydrogen, yield hydrochloric acid, which is advantageously used with metallic silicon to prepare the chlorosilanes, as described hereinabove. The chlorine or hydrogen may also be used to eliminate, optionally, the impurities (solid silicon particles) and/or lithium hydride present in the base mixture prior to electrolysis.

The lithium hydrogenation to prepare the lithium hydride is carried out at 490±20° C. In effect, if the temperature is too low (less than approximately 470° C.), the speed of the hydrogenation reaction is much lower. Contrariwise, if the hydrogenation is carried out at temperatures higher than approximately 510° C., severe corrosion of the materials from which the hydrogenation reactor is fabricated, rapidly results (given the present technical options).

The reaction bath, during such hydrogenation, must be agitated and the operation is preferably carried out at a pressure of less than about 5 bars.

Figure 2:
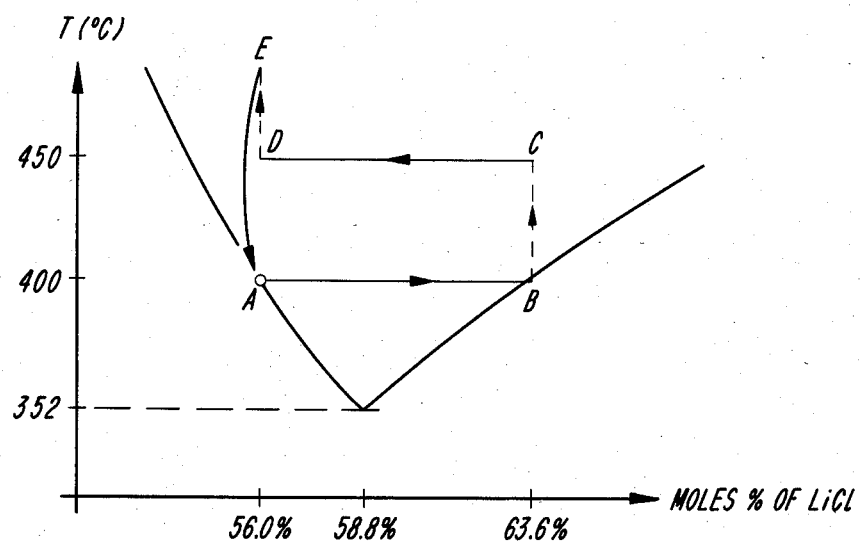
FIG. 2 is a graph plotting reaction temperature (ordinate) versus mole % of lithium chloride (abscissa) according to the invention.

One embodiment of the process/apparatus according to the invention is shown schematically in FIG. 1 of the drawings, with the optimum operating conditions being graphed in FIG. 2.

In particular, in FIG. 1 is shown the reactor 1 wherein the reaction between the chlorosilanes and the lithium hydride is carried out. Through inlet 2 is introduced the mixture of chlorosilanes (for example, HSiCl$_3$ and SiCl$_4$), and via the feed line 3 is cycled the admixture comprising the base mixture (for example, potassium chloride and lithium chloride, with the concentration of lithium chloride therein being about 3 mole % less than the concentration of this salt in the eutectic composition of lithium chloride and potassium chloride) and the lithium hydride, said lithium hydride being present in an amount of up to 21 moles per each 100 moles of said base mixture. The silane is recovered from the reactor 1 via outlet 4, and through the line 5 is cycled the eutectic mixture of molten salts containing at most 21 mole %, with respect to the base mixture, of an excess in lithium chloride.

Any silicon particles contained in the mixture in the line 5 are removed by filtration in the filter 6.

The electrolysis is carried out in the electrolytic cell 7, the same being charged with the feedstream in the line 5, after filtration thereof in the filter 6. Electrolysis in the cell 7 produces chlorine gas which is undiluted with any inert gas and which is vented through discharge 8. Said chlorine gas may be employed in the same facility for the production of the starting material chlorosilanes. Via the line 9 is cycled to the hydrogenation reactor 10 the admixture of the base mixture and the lithium metal, with the latter being present therein up to a maximum concentration of approximately 21 moles of lithium per each 100 moles of the base mixture. The lithium metal would appear to be particulate and dispersed throughout the bath of molten salts.

In said reactor 10, the lithium contained in the molten mixture cycled from the electrolyzer 7 via the line 9 is hydrogenated. The reactor 10 is supplied with hydrogen through inlet 11, and the effluent thereof, an admixture containing the base mixture and a maximum of 21 mole % of lithium hydride is cycled to the silane producing reactor 1 via the line 3. It should be appreciated that all of the lithium present in the molten mixture emanating from the electrolyzer 7 has been converted into lithium hydride. The admixture deriving from the hydrogenation reactor 10 is simply directly transferred to the silane production reactor 1, via the line 3.

In FIG. 2 are graphed the various different operations with respect to the reaction temperatures (ordinate) and to the mole % of lithium chloride (abscissa) contained in a mixture of lithium chloride and potassium chloride comprising the mixture of molten salts; it should be recalled that the eutectic composition lithium chloride/potassium chloride melts at 352° C. and contains 58.8 mole % of lithium chloride.

In this specific example, the composition of the base mixture, indicated by the point A, contains 56 mole % of LiCl, i.e., the mixture contains an about 3 mole % deficit of LiCl vis-a-vis the eutectic composition.

In FIG. 2, the composition of the binary LiCl/KCl mixture may be traced throughout the overall process, and is expressed in mole % of LiCl during each stage thereof. FIG. 2 also indicates the temperatures maintained for each of the reactions, making it possible to remain within the liquid range in the diagram.

In particular:

(i) A-B represents the evolution of the composition of the mixture in the silane production reactor 1, the temperature of such reaction being 400° C.;

(ii) B-C represents heating prior to electrolysis in the electrolytic cell 7;

(iii) C-D represents the electrolysis, per se, at a temperature of 450° C.;

(iv) D-E represents heating to 490° C. prior to hydrogenation at E in the hydrogenation reactor 10; and (V) E-A represents cooling for the recycling of the mixture to the silane production reactor 1, which does not modify the composition of the mixture in LiCl and KCl, the mixture obtained then being recycled into said reactor 1, via line 3.

Figure 3:
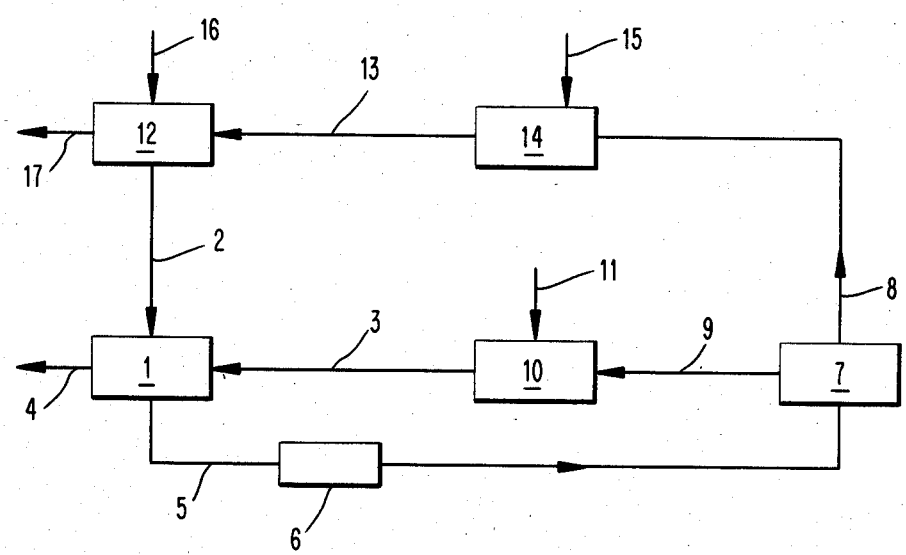
FIG. 3 is a schematic illustration of another embodiment of the apparatus/process according to the invention.

In another specific example of the process of the invention, as illustrated in FIG. 3, a continuous process was carried out under the following conditions:

(1) Composition of the reaction flux exiting the reactor 1 and cycled to the filter 6 (in kmole/hour):
  (i) Total: 2.316
  (ii) LiCl: 1.470
  (iii) KCl: 0.840
  (iv) Si (k.gram atom/hour): 0.006
  (v) Average temperature: 395° C.

(2) Composition of the reaction flux exiting the filter 6 and cycled to the electrolytic cell 7; the same as above, minus the silicon particles eliminated by filtration;

(3) The electrolysis was carried out at an average temperature of 450° C.;

(4) Composition of the reaction flux exiting the electrolyzer 7 and cycled to the hydrogenation reactor 10 (in kmole/hour):
  (i) Total: 2.310
  (ii) LiCl: 1.070
  (iii) KCl: 0.840
  (iv) Li (k.gram atom/hour): 0.400

In addition, 0.200 kmole/hour chlorine gas was recovered, via the discharge outlet 8;

(5) The hydrogenation reaction was carried out at an average temperature of 490° C.;

(6) Composition of the reaction flux exiting the hydrogenation reactor 10 and cycled to the silane production reactor 1 (in kmole/hour); same as above, but the 0.400 k.gram atom/hour of Li had been converted into 0.400 kmole/hour of LiH;

(7) The silane production reactor 1 was charged with a mixture of 0.116 kmole/hour trichlorosilane and 0.013 kmole/hour tetrachlorosilane; and the reaction flux recovered from said reactor 1, via the outlet 4, consisted of 0.123 kmole/hour of silane and 0.012 kmole/hour of hydrogen gas;

(8) The reactor 14 was supplied with 0.200 kmole/hour of chlorine gas obtained from the electrolytic cell 7, via the outlet 8, and 0.200 kmole/hour of hydrogen gas via inlet 15, and the reaction product discharged and cycled via the line 13 comprised 0.400 kmole/hour of hydrogen chloride; and (9) The reactor 12 was supplied, via the line 13, with 0.400 kmole/hour of hydrogen chloride and via the inlet 16 with 0.130 k.gram atom/hour of metallurgical grade silicon. After separation of the reaction product, the reaction fluxes cycled/discharged were a mixture comprised of 0.116 kmole/hour of trichlorosilane and 0.013 kmole/hour of tetrachlorosilane which was cycled as feed for the silane production reactor 1, via line 2, and 0.142 kmole/hour of hydrogen gas was withdrawn via the outlet 17.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A continuous integrated process for the preparation of silane, comprising continuously (i) reacting a chlorosilane with lithium hydride recycled in a base mixture of molten salts comprising lithium chloride and at least one other alkali or alkaline earth metal chloride, in a discrete first reaction zone, (ii) recovering silane product from said first reaction zone, (iii) cycling the silane depleted product of reaction from said first reaction zone, which comprises said base mixture and the additional amounts of LiCl produced in said first reaction zone, to a discrete electrolysis second reaction zone, (iv) electrolyzing lithium chloride comprising said first zone reaction product in said electrolysis second reaction zone, (v) recovering chlorine gas from said electrolysis second reaction zone, (vi) cycling the chlorine depleted product of electrolysis from said second reaction zone, which comprises said base mixture and lithium metal produced in said electrolysis second reaction zone, to a discrete hydrogenation third reaction zone, (vii) hydrogenating the lithium metal comprising said second zone reaction product in said hydrogenation third reaction zone, and (viii) recycling the product of reaction from said hydrogenation third reaction zone, which comprises said base mixture and the first zone reactant lithium hydride produced in said hydrogenation third reaction zone, to said first reaction zone.

2. The process as defined by claim 1, said mixture of molten salts in said first reaction zone being essentially eutectic in composition.

3. The process as defined by claim 2, the first zone reaction admixture comprising up to 21 moles of lithium hydride per each 100 moles of base mixture.

4. The process as defined by claim 3, said electrolysis step (iv) being carried out under agitation and the electrolysis second zone reaction admixture comprising up to 21 moles of lithium chloride per each 100 moles of base mixture.

5. The process as defined by claim 4, said hydrogenation step (vii) being carried out under agitation.

6. The process as defined by claim 4, the lithium chloride being present in said mixture of molten salts in said first reaction zone in a deficiency of from 1 to 4 mole %, with respect to the eutectic composition of the base mixture.

7. The process as defined by claim 4, further comprising filtering said silane depleted product of reaction from said first reaction zone during said step (iii), to remove silicon particulates therefrom.

8. The process as defined by claim 4, said step (i) reaction being carried out at a temperature ranging from 350° C. to 410° C.

9. The process as defined by claim 8, said step (iv) electrolysis being carried out at a temperature ranging from 400° to 500° C.

10. The process as defined by claim 9, said step (vii) hydrogenation being carried out at a temperature ranging from 470° to 510° C.

11. The process as defined by claim 4, further comprising removing any trace amounts of lithium hydride from said base mixture during said step (iii).

12. The process as defined by claim 4, said base mixture of molten salts comprising lithium chloride and potassium chloride.

13. The process as defined by claim 1, further comprising converting the chlorine gas recovered in the step (v) into hydrogen chloride, reacting said hydrogen chloride with free silicon to prepare chlorosilane therefrom, and recycling said chlorosilane to said first reaction zone.

14. Apparatus for the continuous integrated production of silane, comprising (1) a first chlorosilane/lithium hydride reaction zone, (2) a lithium chloride electrolysis second reaction zone, (3) a lithium metal hydrogenation third reaction zone, (4) means for recovering silane product from said first reaction zone, (5) means for cycling silane depleted product of reaction from said first reaction zone to said electrolysis second reaction zone, (6) means for recovering chlorine gas from said electrolysis second reaction zone, (7) means for cycling chlorine depleted product of electrolysis from said second reaction zone to said hydrogenation third reaction zone, and (8) means for recycling product of reaction from said hydrogenation third reaction zone to said first reaction zone.

15. The apparatus as defined by claim 14, said means (5) further comprising means for removing silicon particulates from said silane depleted product of reaction from said first reaction zone.

16. The apparatus as defined by claim 15, further comprising means for converting recovered chlorine gas into chlorosilane and means for recycling such chlorosilane to said first reaction zone.

17. A continuous integrated process for the preparation of silane, comprising continuously (i) reacting a chlorosilane with lithium hydride recycled in a base mixture of molten salts comprising lithium chloride and at least one other alkali or alkaline earth metal chloride, in a discrete first reaction zone at a temperature ranging from 350° to 410° C., (ii) recovering silane product from said first reaction zone, (iii) cycling the silane depleted product of reaction from said first reaction zone, which comprises said base mixture and the additional amounts of LiCl produced in said first reaction zone, to a discrete electrolysis second reaction zone, (iv) electrolyzing lithium chloride comprising said first zone reaction product in said electrolysis second reaction zone at a temperature ranging from 400° to 500° C. under agitation, the electrolysis second zone reaction admixture comprising up to 21 moles of lithium chloride per each 100 moles of base mixture, (v) recovering chlorine gas from said electrolysis second reaction zone, (vi) cycling the chlorine depleted product of electrolysis from said second reaction zone, which comprises said base mixture and lithium metal produced in said electrolysis second reaction zone, to a discrete hydrogenation third reaction zone; (vii) hydrogenating the lithium metal comprising said second zone reaction product in said hydrogenation third reaction zone at a temperature ranging from 470° to 510° C., and (viii) recycling the product of reaction from said hydrogenation third reaction zone, which comprises said base mixture and the first zone reactant lithium hydride produced in said hydrogenation third reaction zone, to said first reaction zone.

* * * * *